United States Patent [19]

McBride

[11] Patent Number: 5,060,875

[45] Date of Patent: Oct. 29, 1991

[54] GRANULATOR KNIFE

[75] Inventor: Thomas D. McBride, Shrewsbury, Mass.

[73] Assignee: Nelmor Company, Inc., North Uxbridge, Mass.

[21] Appl. No.: 532,597

[22] Filed: Jun. 4, 1990

[51] Int. Cl.$^5$ ............................................. B02C 18/18
[52] U.S. Cl. ..................................... 241/242; 241/294
[58] Field of Search ................ 241/293, 294, 73, 242, 241/195; 144/230

[56] References Cited

U.S. PATENT DOCUMENTS

| 3,854,511 | 12/1974 | Maier | 144/230 |
| 3,876,158 | 4/1975 | Rogers | 241/294 X |
| 4,784,337 | 11/1988 | Nettles et al. | 144/176 X |
| 4,887,772 | 12/1989 | Robinson et al. | 144/176 X |
| 4,969,605 | 11/1990 | Morin | 241/242 X |

FOREIGN PATENT DOCUMENTS 2736612 2/1979 Fed. Rep. of Germany ...... 241/294

Primary Examiner—Mark Rosenbaum
Attorney, Agent, or Firm—Samuels, Gauthier & Stevens

[57] ABSTRACT

A granulator knife having opposed reversible cutting edges. The knife is seated in a rotor or a bed and secured by a clamp. When the first knife edge is worn, the knife may be reversed. Adjustment of the knife position is not necessary.

3 Claims, 5 Drawing Sheets

GRANULATOR KNIFE

BACKGROUND AND BRIEF SUMMARY OF THE INVENTION

A granulator is used to reduce the size of plastic or other materials to particles small enough to be used in reprocessing, disposal, etc. This size reduction is accomplished through the use of knives to cut the material into smaller pieces. A granulator has one or more stationary (bed) knives and two or more rotating (rotor) knives. When a rotor knife passes a stationary knife, a cutting action is produced, assuming that a piece of material is located between the knives. A half cylinder containing a large number of perforations (screen) is located directly below the knives to control the size of granulated particles leaving the cutting area. Particles are forced to remain in the cutting area until they are small enough to fall through the screen.

Granulators of this basic type have been manufactured for over 30 years. The traditional approach to design has been to make the knife large enough to accommodate several round holes so that bolts can be inserted through these holes for the purpose of clamping the knife to its mating structure. Knives are currently manufactured from a solid piece of tool steel, which is usually "hardened" using a thermal heat treatment process. Once knives become dull, they are typically removed from the machine, resharpened, and installed back into the granulator. This requires frequent readjustment of the clearances between the rotor and bed knives each time knives are resharpened. The cost of resharpening, along with the removal and installation labor, can be substantial. A typical knife can be resharpened about five times before it becomes too small to be effective and must be disposed of. When a knife is disposed of, it still contains approximately ninety percent of its original material.

Another problem with conventional knives is that as they become dull the quality of the granulated material suffers. Dulled knives tend to "beat" or "hammer" the material rather than cut it. As a result, the amount of dust or "fines" in the granulate increases. Users wish to reduce the amount of fines to a minimum, because the dust is objectionable from an environmental standpoint, it causes problems in material transfer systems, and usually results in waste.

If knives could remain sharp for a longer period of time, the costs associated with resharpening and changing the knives would be reduced. The quality of the granulated material would also be improved.

Extending the life of a cutting edge requires a more durable material; i.e., a material that wears better and is not brittle. Such materials do exist. The real problem arises when one attempts to use these exotic materials in a conventional knife configuration. The cost per pound of these materials is significantly higher than conventional tool steels, and this approach is just not economically attractive.

Over the years there have been many attempts to improve the life of granulator knife cutting edges. The development of better tool steels has caused some increases in knife life, compared to common chrome-vanadium-steels (CVS), but at a higher cost. Better life can be obtained from a knife made from hardened D-2 tool steel, but the cost is about 40 percent higher. Still greater life can be achieved by treating a knife surface with a flame sprayed tungsten or titanium carbide coating. Knife life can triple, compared to that of a chrome-vanadium-steel knife, but not without a substantial increase in cost.

Other coatings on conventional knives have been tried with the goal of improving edge life. Titanium nitride coatings, which have dramatically improved the life of such things as drill bits, have been tried. Although some improvement was achieved, the economics are not attractive.

During the 1970's, most granulator manufacturers offered a knife consisting of strips of tungsten carbide attached to mild steel knife bodies. The tungsten carbide is very hard and would enhance the wear characteristics, while the majority of the knife is made from low cost mild steel. Although this approach met with some success, the difficulties in joining the two metals made this a very expensive process, and therefore not a good solution to the knife wear problem. In a similar fashion, D-2 tool steel strips were attached to mild steel bodies. This approach also did not prove to be reliable or economical.

Metallurgically bonding a small amount of titanium carbide particles suspended in a tool steel matrix to a conventional tool steel body in an attempt to achieve an economical solution to knife wear has been attempted. The product is machinable before heat treatment, after which it requires grinding. While this approach sounds promising to some, the initial cost of a set of knives is very high.

Another approach tried was to apply a cladding to the knife tip area on a mild steel knife base. After the very hard stellite material was applied, the final knife cutting edge had to be machined through an electrical discharge machining (EDM) process. The economics of this approach did not prove to be acceptable.

Several granulator manufacturers experimented with knives and rotors having intermeshing teeth or grooves, in an attempt to reduce the amount of time required for knife adjustment. By moving each knife "forward" by one tooth when it is reinstalled, by theory further adjustment becomes unnecessary. This approach required that knives be resharpened to exacting dimensions so that the cutting edges are at predicted locations after being re-installed in the granulator. The additional cost of building the teeth in the rotors and knives, plus the added care required during sharpening has also caused this approach to be unsuccessful.

A small, reversible, and expendable knife was developed, see U.S. Pat. No. 3,981,337. Its complex shape is produced by extrusion from a high durability proprietary steel, and the final critical features are produced by grinding. This knife is positioned and retained to its mounting surface by a clamp. While the economics of the knife itself appear to be good, there are two problems. First, the life is not significantly better than what is achievable using a conventional knife made of D-2 tool steel. Secondly, the knife requires complex and precise features on both its mounting surface and its clamp. The costs associated with dedicated fixturing and tooling required to manufacture these components make this knife a less attractive solution.

The present invention overcomes these prior art problems. A knife design is provided which uses considerably less exotic material when compared to prior art products and is easier to manufacture.

The cutting edges of the knife being in cross-section, the acute angles of a trapezoid and thus two cutting edges are located opposite each other. This knife is characterized by at least two holes, one near each end of the knife. These holes have precise diameters and are very accurately located equidistant from the two cutting edges and from each other. These holes are used as locating features in the knives. The knife is placed on a mounting surface (either the rotor seat or the bed knife clamping bar), which contains protruding locating pins. These pins are precise in both diameter and location and have the function of accurately positioning the knife edges in the granulator. This pin arrangement ensures the accuracy of each cutting edge location.

Once positioned, each knife is rigidly held in place by a clamping bar. Bolts are inserted through holes in the clamping bars, and once the bolts are tightened the knives are held tightly to their mounting surfaces.

Once a cutting edge becomes dull, the knife can simply be reversed, placing its opposite edge into the cutting position. Unlike conventional knife systems, no readjustment is required after the knives have been reversed. After the second edge has become dull, the user can resharpen each edge one time. When the knives are resharpened, the bed knives must be readjusted to provide the proper clearance for cutting.

The knife and clamping arrangement disclosed herein dramatically improve the economics of attaining longer lasting knife edges, reduces machine downtime, reduces labor costs of changing knives, and improves granulate quality by minimizing fines.

The knife is smaller and requires less material to manufacture. The reduced size is attained because a separate clamp bar is used to retain the knife as opposed to bolting the knife down directly. The small configuration permits the economical use of exotic materials which will stay sharp much longer.

DESCRIPTION OF THE PREFERRED EMBODIMENT(S)

The knife assembly of the invention may be used with any conventional granulator by modifying the rotor seat and/or bed knife seat and clamp of the granulator to accommodate the knife design of the invention.

Figure 1:
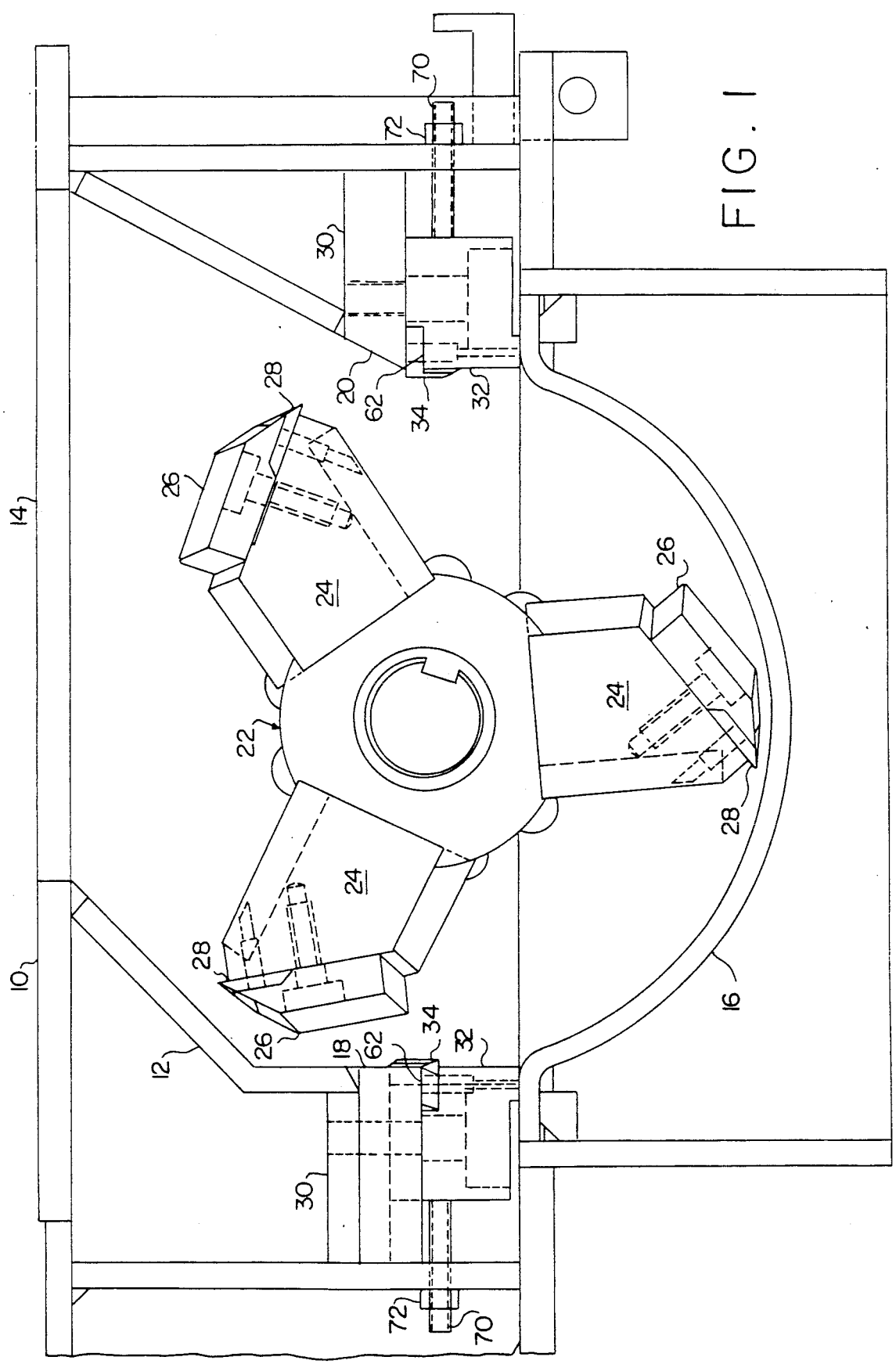
FIG. 1 is an end view of a knife assembly embodying the invention.

Referring to FIG. 1, a granulator is shown generally at 10 and comprises a housing 12 having an upper inlet 14 and a lower screen 16. On either side of the housing are bed knife assemblies 18 and 20. A three-bladed rotor 22 is secured in the housing in a conventional manner. The rotor comprises arms 24 and clamps 26 which join blades 28 to the rotor.

Each bed knife assembly (18 and 20) comprises a bed knife seat 30 and a clamp 32 which joins a blade 34 to the seat.

Figure 2:
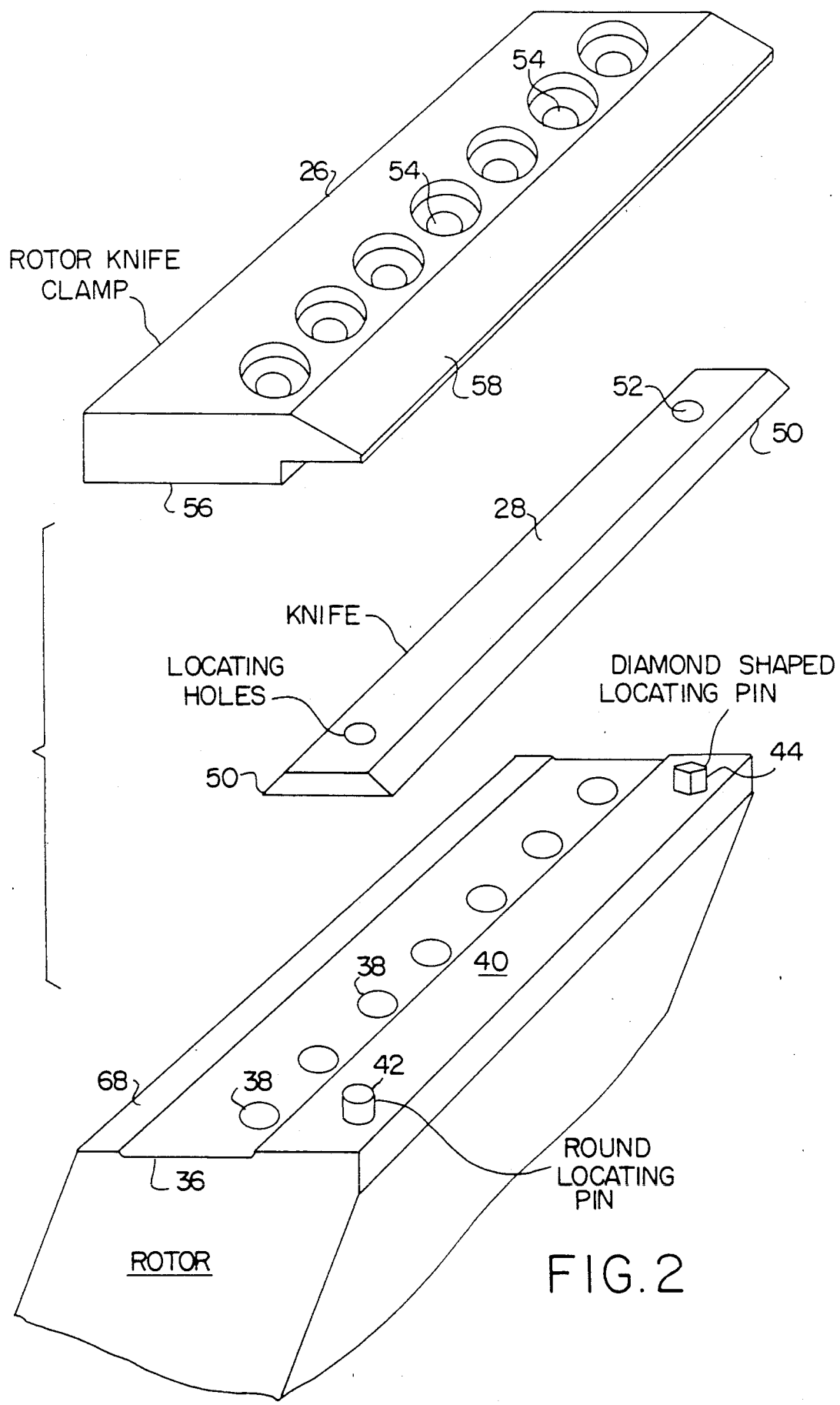
FIG. 2 is an exploded perspective view of a rotor knife assembly.

Referring to FIG. 2, the end of each rotor arm has formed therein a rectangular-shaped recess 36 having a plurality of tapped holes 38. The leading edge of the rotor arm includes a blade seat 40 having locator pins 42 and 44. The trailing edge of the rotor arm includes a ledge 68.

The blade 28 when viewed in cross-section is trapezoidal. Opposed cutting edges 50 form the acute angles of the trapezoid. The blade 28 includes locating holes 52. The base of the blade 28 engages the seat 40, with the locator pins 42, 44 passing through the locating holes 52.

Figure 3:
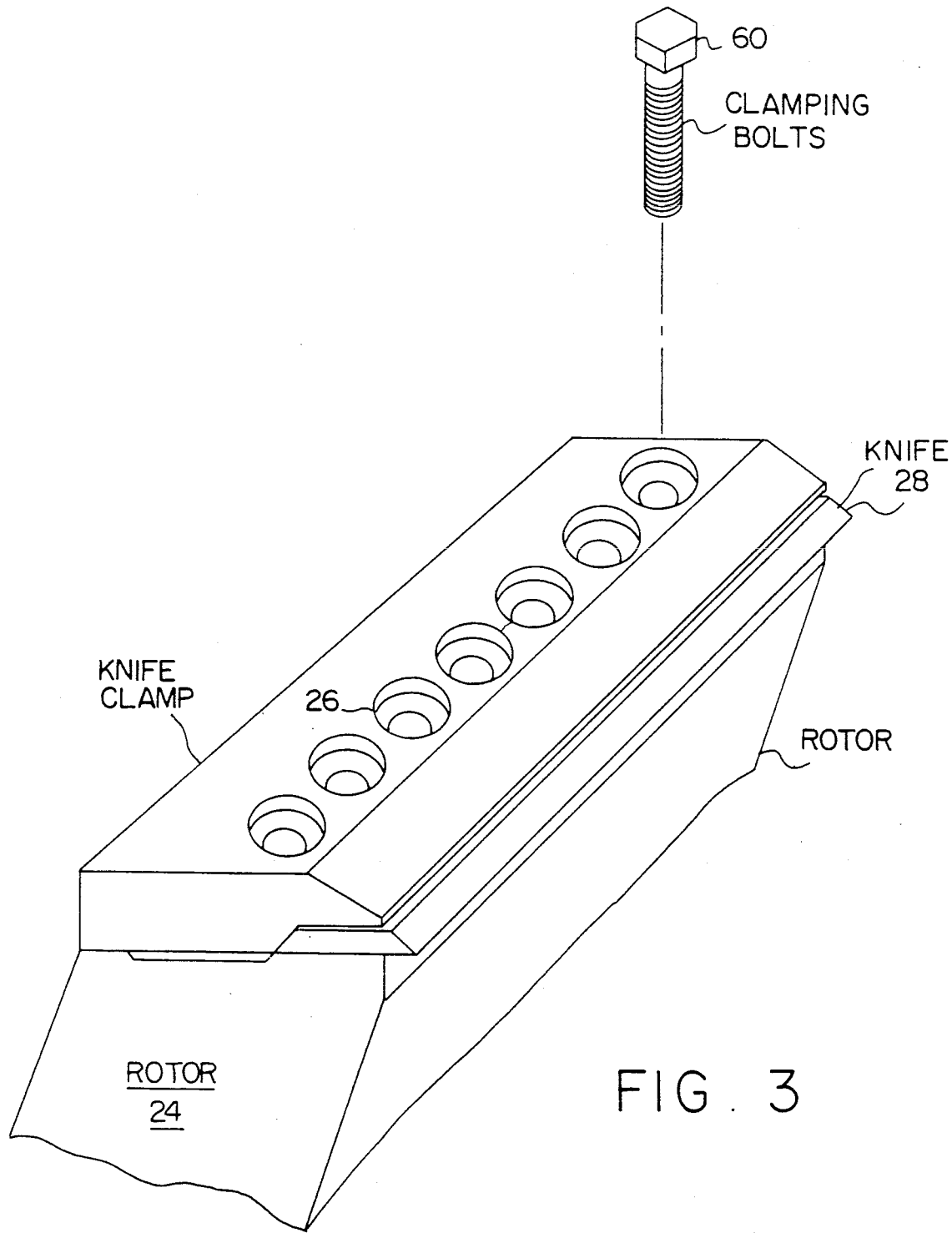
FIG. 3 is a perspective view of the rotor knife assembly of FIG. 2.
Figure 4:
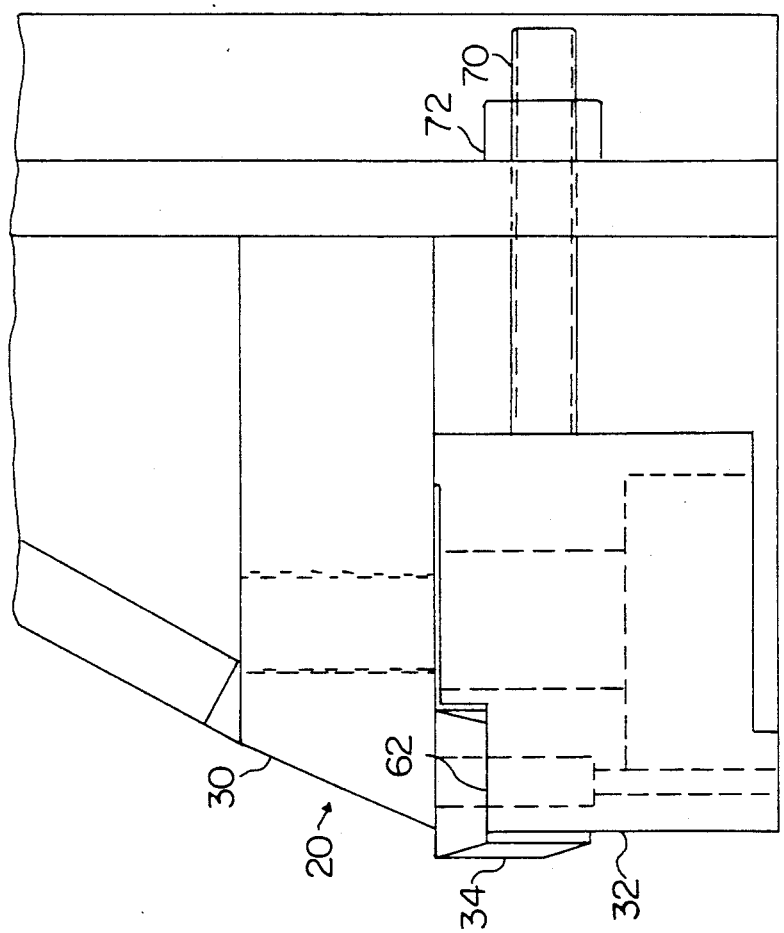
FIG. 4 is a side view of a bed knife assembly.

The clamp 26 includes a plurality of holes 54, which when the clamp is engaged to the rotor are in register with the tapped holes 38. The clamp includes a rectangular base 56 which rests on the ledge 68 in the rotor arm 24. The clamp 26 further includes an extending lip 58 which extends over and engages the upper surface of the knife 28. The rotor knife 28 is shown in assembled position in FIG. 3 with one clamping bolt 60.

Figure 5:
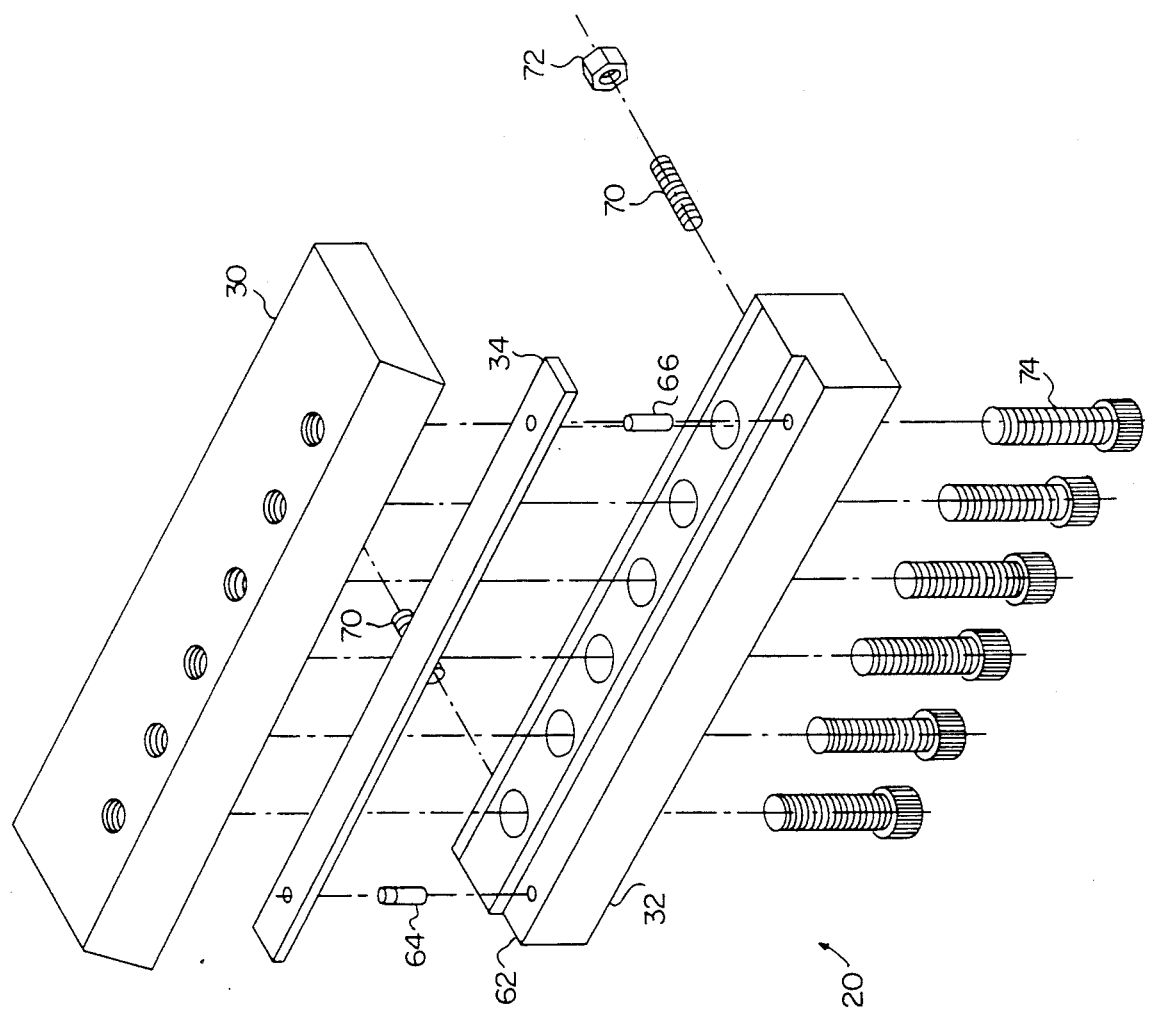
FIG. 5 is a perspective view of FIG. 4.

Referring to FIGS. 1 and 5, the bed knife clamp 32 of a prior art granulator is modified by forming a stepped surface 62 thereon and includes two locator pins 64 and 66 extending upwardly from the surface 62. The knife 34 seats on the surface 62 and is secured to the bed knife seat 30. Several threaded fasteners 74 secure the clamp 32 to the seat 30.

The bed knives 18 and 20 are adjustable. The locking nuts 72 on the two fasteners 70 are loosened and the fasteners 70 are adjusted thereby moving the bed knife clamp 32 and bed knife 34. When the alignment between rotor knives and bed knives is correct, the nuts 72 and fasteners 74 are secured.

Conventional milling, drilling, reaming, grinding and heat treating equipment are used to configure the product. The basic cross-section could also be attained by extrusion as opposed to machining the cutting angle. However, this knife design is so simple that the use of such sophisticated equipment would not be economically attractive.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

I claim:

1. In a granulator having rotary knives and bed knives and a rotor to carry the rotor knives, the improvement which comprises:
   the rotor having a mounting surface with a knife seat including a rectangular-shaped recess, the seat having only two fixed locator pins for accurately positioning a rotary knife;
   each rotary knife being a reversible, non-adjustable trapezoidal knife having only two holes and precisely positioned on said surface by said locator pins; and
   a clamping bar secured to the mounting surface to hold each rotary knife in its position to form a clamping assembly consisting of a rotor seat-knife-clamping bar.

2. The granulator of claim 1 wherein the mounting surface includes a plurality of tapped holes;
   the clamping bar includes a plurality of holes in registration with the tapped holes; and
   a plurality of threaded fasteners secures the clamping bar to the mounting surface.

3. The granulator of claim 1 wherein one of said pins is circular and the other of said pins is diamond-shaped.

* * * * *